June 25, 1929. J. E. BROBST 1,718,523
AUTOMATIC TIME ELEMENT RELAY AND CONTROL SYSTEM EMPLOYING THE SAME
Filed Dec. 27, 1924
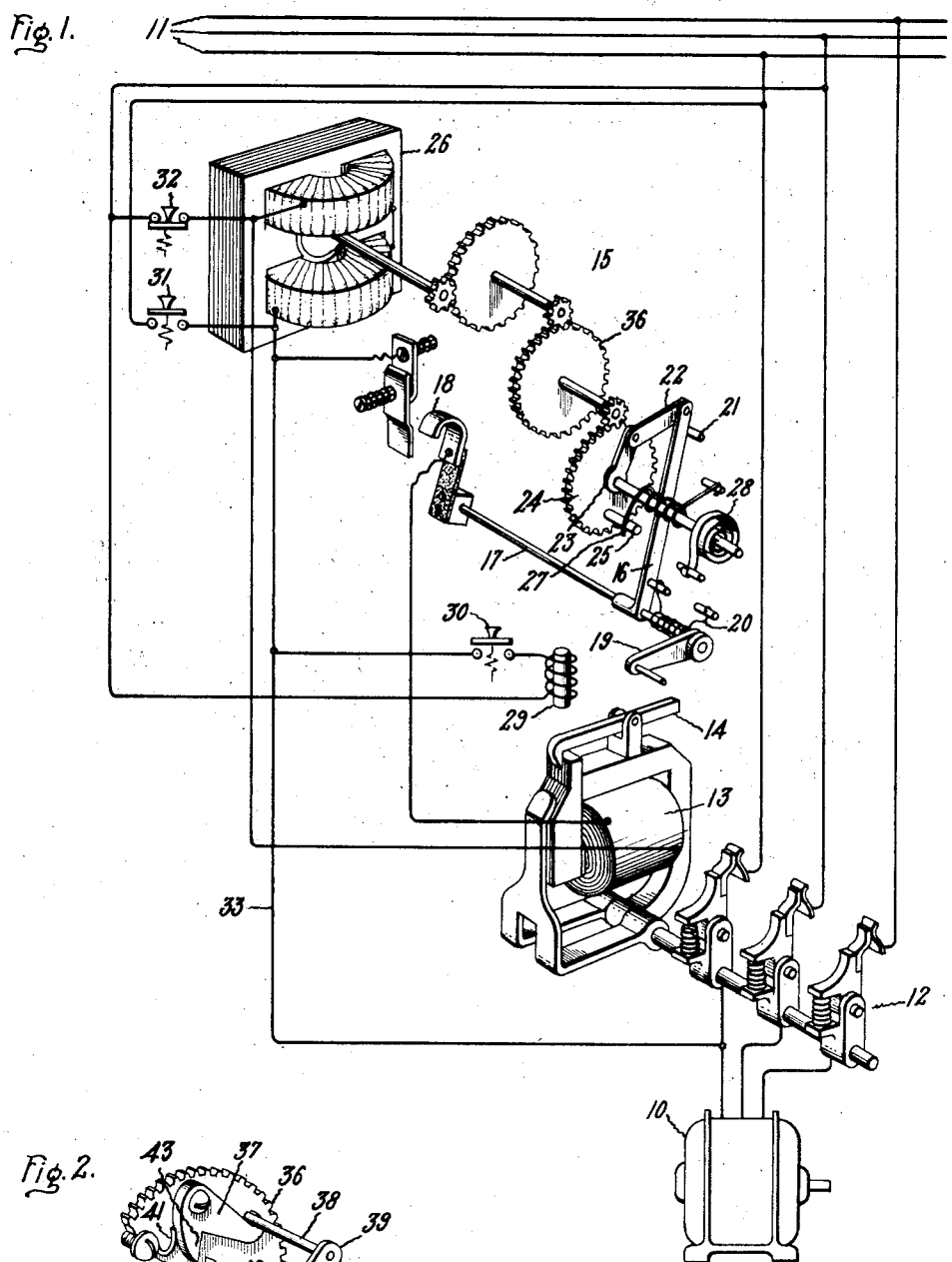
Inventor:
John E. Brobst,
by
His Attorney.

Patented June 25, 1929.

1,718,523

UNITED STATES PATENT OFFICE.

JOHN E. BROBST, OF SCHENECTADY, NEW YORK, ASSIGNOR TO GENERAL ELECTRIC COMPANY, A CORPORATION OF NEW YORK.

AUTOMATIC TIME-ELEMENT RELAY AND CONTROL SYSTEM EMPLOYING THE SAME.

Application filed December 27, 1924. Serial No. 758,478.

This invention relates to time element relays and more particularly to automatic relays which are operated with a time delay responsively to predetermined electrical conditions and to control systems employing the same.

One of the objects of the invention is to provide an improved form of electroresponsive relay having a controlling member which is positively operated from one controlling position to another controlling position a time interval after a predetermined reduction in the energization of the relay.

A further object of the invention is the provision of a novel arrangement of control apparatus and circuits whereby a relay of the above character may afford automatic time delay protection to an electric translating device against predetermined electrical conditions such as, undervoltage, under current, and the like.

Although not necessarily limited thereto, the invention may be applied advantageously to afford automatic time element undervoltage protection to an electric translating device such as an electric motor where it is required that the motor be maintained connected to the supply lines during temporary fluctuation in the line voltage and disconnected only when the line voltage is reduced below a certain value for an appreciable time interval. The invention is particularly well adapted to afford automatic time element undervoltage protection where it is desired that the motor be connected to and disconnected from the supply lines by means of an electromagnetic line switch or contactor under the control of start and stop push buttons and that the line switch or contactor be mechanically latched in the closed position and arranged to be opened only a time interval after the occurrence of undervoltage or upon the operation of the stop button.

In carrying the invention into effect in a motor protective system of the above character, my improved form of electroresponsive time element relay is connected to be energized responsively to the voltage of the supply lines upon the closure of the line switch. The relay is provided with a movable controlling member for automatically interrupting the energizing circuit of the electromagnetic line switch a time interval after the switch is mechanically latched in the closed position as well as for automatically releasing the latch to permit the switch to open a time interval after a predetermined reduction in the voltage of the supply lines.

In accordance with the preferred form of the invention the movable controlling member of the electroresponsive time element relay is biased to the controlling position wherein it opens the energizing circuit of the line switch and the relay is provided with an electric motor normally connected through speed reducing gearing to oppose the torque of a rotatable member which is strongly biased to operate the controlling member to the position wherein it releases the latch of the line switch to permit the same to open.

For a better understanding of the invention reference is had to the following description taken in connection with the accompanying drawing in which Fig. 1, is a schematic diagram of a motor protective system embodying the invention and Fig. 2 is a detailed view partly in section of a modification of certain parts of the control apparatus shown in Fig. 1.

The novel features and combinations which I believe to be characteristic of my invention are pointed out with particularity in the appended claims.

Referring to Fig. 1 of the drawing, the electric motor 10, which as shown is of the three phase alternating current type, is arranged to be connected to the three phase supply lines 11 through the triple pole electromagnetic switch 12. The switch 12 is biased to the open position and is provided with an electromagnet 13 for operating the switch to the closed position and with the pivoted latch 14 for mechanically holding the switch in the closed position independently of the operating electromagnet 13.

In accordance with the invention an electroresponsive time element relay 15 is provided for automatically controlling the electromagnet switch 12. This relay comprises a movable controlling member 16 which is secured to and pivotally supported by the shaft 17 which it will be understood is provided with suitable bearings not shown in the drawing.

The energizing circuit of electromagnet 13 is controlled by the movable controlling member 16 through the agency of the circuit controlling contact 18 which is mounted upon and suitably insulated from one end of the shaft 17 and the operating arm 19 is secured to the other end of shaft 17 in cooperating relation with the pivoted latch 14. The controlling member 16 is biased by suitable means such as the spring 20 to the position in which it engages the stationary stop 21 with the circuit controlling member 18 out of engagement with the stationary contact cooperating therewith and the operating arm 19 out of engagement with the latch 14 as shown in the drawing.

In order to successively engage the movable circuit controlling contact 18 with the stationary contact cooperating therewith and the operating arm 19 with the latch 14, the movable controlling member 16 is connected through the link 22 to the lever 23 which is loosely supported upon the shaft of gear wheel 24 in the path of the pin 25 carried by the gear wheel. The electric controlling motor 26 is connected through suitable speed reducing gearing as shown in the drawing to rotate the gear wheel 24 in a clockwise direction and carry the pin 25 into engagement with the resilient stop 27 upon the energization of the controlling motor responsively to the voltage of supply lines 11. The biasing spring 28 is arranged to oppose the torque of motor 26 and move the wheel 24 in a counter clockwise direction upon a predetermined reduction in the energizing voltage of motor 26. It will be evident that due to the speed reducing connections between the rotatable wheel 24 and the motor 26, the wheel 24 will be rotated in each direction with a time delayed action. Thus when the pin 25 is rotated out of engagement with flexible stop 27 by the biasing spring 28, the lever 23 will be engaged after a time interval to move the controlling member 16 out of engagement with the stop 21 and successively close the circuit controlling member 18 and engage arm 19 with latch 14.

The tripping electromagnet 29 is controlled by the normally opened push button 30 in order to release the latch 14 independently of the operation of electroresponsive time element relay 15. The normally opened push button 31 is arranged to control the energization of operating electromagnet 13 and the normally closed push button 32 is arranged to control the energization of the motor 26 in a manner which will be more fully understood from the following description of the operation of the control system shown in Fig. 1.

With the three phase supply lines 11 energized from a suitable source of alternating current and with the several parts of the control system in their respective positions shown in the drawing, the motor 10 will be energized from the supply lines 11 since the switch 12 is shown mechanically latched in the closed position. Likewise, the controlling motor 26 of the electroresponsive time element device 15 will be energized from supply lines 11 through a circuit extending from the lower of the supply lines 11 through the left hand contacts of the triple pole switch 12, the conductor 33, the operating windings of motor 26, the normally closed push button 32, and thence to the middle of the supply lines 11. Under these conditions, the motor 26 exerts a torque upon the gear wheel 24 in the clockwise direction and thus maintains the pin 25 in engagement with the flexible stop 27 against the opposing torque of the spring 28. The motor 26 and the speed reducing gearing through which it operates are so proportioned that when the voltage of supply lines 11 is reduced a predetermined amount below its normal value, as for example a 75% reduction in the voltage of supply lines 11, the torque of biasing spring 28 predominates over the torque of motor 26 by an amount dependent upon the reduction in the energizing voltage of the motor and the gear wheel 24 starts to rotate in the counter clockwise direction and thereby carries the pin 25 out of engagement with the flexible stop 27. After a time interval which is dependent upon the amount of reduction in the energizing voltage of the motor 26, the inertia of the rotating parts, as well as the frictional resistance inherent in the speed reducing gearing, the pin 25 is rotated into engagement with the lever 23 which is operatively connected through the link 22 to move the controlling member 16 out of engagement with the stationary stop 21 against the bias of spring 20. In this way, the movable controlling member 16 is operated from its biased position to first close the circuit controlling member 18 and then engage the operating arm 19 with the pivoted latch 14 to release the switch 12.

It should be noted that although closure of circuit controlling member 18 energizes the operating winding of electromagnet 13 in parallel circuit with the windings of controlling motor 26, nevertheless the resulting magnetic attraction of electromagnet 13 is insufficient to hold the switch 12 in the closed position due to the fact that the voltage impressed upon the winding of electromagnet 13 is greatly reduced below the normal operating value. Hence, when the latch 14 is released by the operating arm 19, the switch 12 immediately opens in accordance with its bias and deenergizes the motor 10 as well as the electromagnet 13 and the motor 26 of the automatic time element relay 15.

While the voltage of supply lines 11 continues at a reduced value the switch 12 will not be reclosed. However, upon the return of the voltage of supply lines 11 to substantially the normal value, closure of the push button 31 establishes an energizing circuit for the closing electromagnet 13 which may be traced from the lower of the supply lines 11 through the push button 31 in the closed position, the circuit controlling contact 18 in the closed positon, the operating winding of electromagnet 13, and thence through the normally closed push button 32 to the middle of the supply lines 11. The resulting energization of electromagnet 13 operates the triple pole switch 12 to the closed positon to reconnect the motor 10 to the supply lines 11 and at the same time establishes a holding circuit in shunt with the push button 31 through the left hand contacts of switch 12 and conductor 33 in order to maintain the electromagnet 13 energized to magnetically hold the switch 12 closed after the push button 31 is released to return to the open position in accordance with its bias. This is necessary due to the fact that the mechanical latch 14 is maintained released by the operating arm 19 until after the controlling member 16 is permitted to return to its biased position.

It will be observed that the motor 26 of relay 15 is energized simultaneously with the energization of electromagnet 13 and at once starts to rotate the gear wheel 24 with a time delay in the clockwise direction against the opposing bias of spring 28. As pin 25 on the gear wheel 24 is thus rotated in a clockwise direction, the biasing spring 20 of the movable controlling member 16 causes the lever 23 to follow the movement of pin 25 and the controlling member 16 moves with a time delay toward the fixed stop 21. During the return of the controlling member 16 to its biased position, first the operating arm 19 is moved out of engagement with latch 14 to permit the latter to return into latching relation with the switch 12 and a short time interval thereafter the circuit controlling contact 18 is operated out of engagement with the stationary contact cooperating therewith to interrupt the energizing circuit of electromagnet 13 and thus leave the switch 12 mechanically latched in the closed position as shown in the drawing. After the engagement of the controlling member 16 with the stop 21, motor 26 continues to rotate the gear wheel 24 in a clockwise direction until the pin 25 engages with and is stopped by the flexbile stop 27. In this way the several parts of the control apparatus are returned to the position in which they are shown in the drawing preparatory to a subsequent opening of the switch 12, a time interval after a predetermined reduction in the voltage of supply lines 11 in the manner previously described.

It will be evident that the latch 14 may be released to open the switch 12 at any time either by operation of the push button 30 to energize the tripping electromagnet 29 or by operation of the normally closed push button 32 to deenergize the motor 26 of relay 15 to permit the operating arm 19 of the latter to release the latch 14 after a predetermined time interval.

The time element relay 15 may be modified if desired so as to disconnect the gear wheel 24 from the motor 26 when the former has been rotated through a predetermined angular distance by the biasing spring 28 in order to insure that the arm 19 always strikes the latch 14 a hammer blow to release switch 12. A suitable arrangement for this purpose is shown in Fig. 2 in which the gear wheel 24 is arranged to be driven by a pinion gear 34 loosely mounted to rotate upon the shaft 35 and operatively connected to be driven by the gear wheel 36 through the agency of the pivoted latch 37 which is mounted upon the gear wheel 36 and is arranged to engage the pin 38 projecting from the lever 39 which is secured to the pinion gear 34. The gear wheel 36 is loosely mounted to rotate upon the shaft 35 which it will be observed is suitably pinned to the support 40 in order to prevent rotation thereof. The pivoted latch 37 is biased into latching relation with the pin 38 by a suitable biasing spring 41 and a movable trigger 42 is secured to the shaft 35 in the path of a tapered finger 43 with which the latch 37 is provided in order to move the latch 37 out of engagement with the pin 38 when the gear wheel 36 is rotated a predetermined angular distance in a clockwise direction by the biasing spring 28.

When the electroresponsive time element relay 15 shown in Fig. 1 is provided with the arrangement shown in Fig. 2, the operation of the relay is as follows. The gear wheel 24 is rotated in a clockwise direction to carry the pin 25 into engagement with the flexible stop 27 upon the energization of motor 26 as previously described, the pinion gear 34 being operatively connected through the lever 39, the pin 38 and the latch 37 to be rotated in a counter clockwise direction by the gear wheel 36. As the gear wheel 36 thus is rotated finger 43 of latch 37 rides over the movable trigger 42 without disturbing the operative connections between the gear wheel 36 and the pinion gear 34.

However, when the energization of motor 26 is reduced below the predetermined value at which biasing spring 28 starts to rotate the gear wheel 24 with a time delay in the opposite direction, the pinion gear 34 and the gear wheel 36 then will be rotated in a clockwise direction. Under these conditions the finger 43 of latch 37 will be carried into abutting engagement with the trigger 42 and the latch 37 will be rotated against the bias of spring 41 to disengage the pin 38. This disconnects the gear wheel 24 from the motor 26 and permits the former to be rotated by the spring 28 without further time delay action. Preferably the arrangement is such that the gear wheel 24 is disengaged from motor 26 when the pin 25 is moved into engagement with the lever 23 thus permitting the subsequent movement of controlling member 16 to occur without further retardation and thereby insure the engagement of operating arm 19 with latch 14 with a hammer blow to release the latter under all conditions.

In accordance with the provisions of the patent statutes, I have described the principle of operation of my invention together with the apparatus which I now consider to represent the best embodiment thereof, but I would have it understood that the apparatus shown is only illustrative and that the invention may be carried out by other means.

What I claim as new and desire to secure by Letters Patent of the United States, is:

1. An electroresponsive time element relay comprising an electric motor, a rotatable member normally connected to be rotated to a predetermined position upon the energization of said motor, biasing means for rotating said member with a time delay from said position to a second position upon a predetermined reduction in the energization of said motor, and means for disconnecting said rotatable member from said motor upon a predetermined rotation thereof by said biasing means.

2. An electroresponsive time element relay for controlling electric circuits comprising an electric motor, a rotatable member normally connected through speed reducing gearing to be rotated with a time delay to one position upon the energization of said motor, a biasing spring for rotating said member with a time delay from said one position to another position upon a predetermined reduction in the energization of said motor, circuit controlling means disposed in the path of said member to be operated thereby upon the rotation of said member from said one position, and means for disconnecting said motor from said member after a predetermined rotation thereof from said one position.

3. An electroresponsive time element relay for controlling electric circuits comprising a movable controlling member operable between two positions and biased to one of said positions, a rotatable member biased into engagement with said movable member to operate the same to the other position, an electric motor normally connected through speed reducing gearing to rotate said member out of engagement with said first member upon the energization thereof and for delaying the reengagement of said members a time interval after a predetermined reduction in the energization of said motor, and means for disconnecting said motor from said rotatable member upon the engagement thereof with said controlling member.

4. In combination, an electroresponsive switch biased to the open position and having a latch for holding the same in the closed position when electrically operated thereto, an electroresponsive time element circuit controlling relay connected to be set into operation simultaneously with the energization of said switch for automatically de-energizing the said switch a predetermined time interval thereafter, the said relay having an operating member for releasing said latch a time interval after a predetermined reduction in the energization of the relay.

5. In combination an electromagnetic switch biased to the open position and having a latch for holding the same in the closed position, switch mechanism for connecting the winding of said switch to a source of supply to close the switch, a voltage responsive time element relay connected to be energized responsively to the voltage of said source upon closure of said switch for automatically interrupting the energizing circuit thereof a predetermined time interval after the closure thereof, and means controlled by said relay for releasing said latch to permit said switch to open in accordance with its bias a time interval after a predetermined decrease in the voltage of said source.

6. Automatic time element undervoltage protective control apparatus for an electric translating device comprising an electromagnetic switch biased to the open position and operable to the closed position for connecting the device to a source of supply, a latch for holding said switch in the closed position when operated thereto, manually controlled means for controlling the energization of said switch, and an electroresponsive time element relay having a normally closed circuit controlling member connected in the energizing circuit of said switch and a movable arm biased to release said latch, and connections whereby the said relay is operated responsively to the voltage impressed upon the device to deenergize said switch a time interval after the closure thereof and is operated responsively to a predetermined reduction in the voltage impressed upon the device to release said latch after a time interval.

7. In combination, an electroresponsive circuit controlling switch biased for operation to the circuit opening position, an electroresponsive time element device operable in response to predetermined under-voltage conditions in the circuit controlled by the said switch for effecting the operation of said switch in accordance with its bias a time interval after the occurrence of said under-voltage conditions, a master switch biased to open position and connected to control the energization of said electroresponsive switch, connections controlled by said electro-responsive switch upon closure thereof for energizing the said time element device in accordance with the voltage of the circuit controlled by the switch, and switch mechanism associated with the time element device and connections controlled thereby for controlling the energization of said electroresponsive switch after the closure thereof independently of said master switch.

In witness whereof, I have hereunto set my hand this 26th day of December, 1924.

JOHN E. BROBST.